United States Patent
Aoki et al.

(10) Patent No.: US 11,694,377 B2
(45) Date of Patent: Jul. 4, 2023

(54) EDITING DEVICE AND EDITING METHOD

(71) Applicant: HONDA MOTOR CO., LTD., Tokyo (JP)

(72) Inventors: Yuki Aoki, Wako (JP); Hisashi Murayama, Wako (JP); Koichi Kono, Wako (JP); Masahide Kobayashi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/392,283

(22) Filed: Aug. 3, 2021

(65) Prior Publication Data

US 2022/0044460 A1 Feb. 10, 2022

(30) Foreign Application Priority Data

Aug. 7, 2020 (JP) .................................. 2020-134707

(51) Int. Cl.
| | |
|---|---|
| *G06T 11/60* | (2006.01) |
| *G10L 25/63* | (2013.01) |
| *G06F 16/51* | (2019.01) |
| *G06F 16/58* | (2019.01) |
| *G06V 20/59* | (2022.01) |
| *G06V 40/16* | (2022.01) |

(52) U.S. Cl.
CPC .............. *G06T 11/60* (2013.01); *G06F 16/51* (2019.01); *G06F 16/5866* (2019.01); *G06V 20/59* (2022.01); *G06V 40/176* (2022.01); *G10L 25/63* (2013.01)

(58) Field of Classification Search
CPC ...... G06T 11/60; G06F 16/51; G06F 16/5866; G06F 16/535; G06F 16/583; G06V 20/59; G06V 40/176; G06V 10/62; G06V 10/772; G06V 20/597; G10L 25/63
See application file for complete search history.

(56) References Cited

U.S. PATENT DOCUMENTS

| | | | | |
|---|---|---|---|---|
| 2009/0027399 A1* | 1/2009 | Sato | ..................... | G11B 27/034 |
| | | | | 345/418 |
| 2013/0253833 A1* | 9/2013 | Tuukkanen | ......... | G06F 3/04847 |
| | | | | 701/538 |
| 2017/0251163 A1* | 8/2017 | Ochiai | ............... | G01C 21/3602 |

FOREIGN PATENT DOCUMENTS

| | | |
|---|---|---|
| JP | 2018-059960 | 4/2018 |
| JP | 2018-132906 | 8/2018 |

* cited by examiner

*Primary Examiner* — Jacinta M Crawford
*Assistant Examiner* — Andrew Shin
(74) *Attorney, Agent, or Firm* — Amin, Turocy & Watson, LLP

(57) ABSTRACT

An editing device acquires a first image in which an occupant of a vehicle has been imaged in association with a time point in a time series and a second image in which scenery around the vehicle has been imaged in association with a time point in a time series, acquires first index information indicating feelings of the occupant when the first image has been captured on the basis of the first image, and extracts the first image and the second image from first images of the time series and second images of the time series on the basis of the first index information and the time point associated with the first image based on the first index information to generate a library including the extracted images.

9 Claims, 14 Drawing Sheets

EDITING DEVICE AND EDITING METHOD

CROSS-REFERENCE TO RELATED APPLICATION

Priority is claimed on Japanese Patent Application No. 2020-134707, filed Aug. 7, 2020, the content of which is incorporated herein by reference.

BACKGROUND

Field

The present invention relates to an editing device and an editing method.

Description of Related Art

Conventionally, an information processing server for editing images captured during a travel period in accordance with a predetermined editing policy and generating an image library during the travel period is known (Japanese Unexamined Patent Application, First Publication Nos. 2018-132906 and 2018-059960).

SUMMARY

However, a user's satisfaction associated with an image library edited by the above-described information processing server may be low.

The present invention has been made in consideration of such circumstances, and one of objectives of the present invention is to provide an editing device and an editing method for generating a library that satisfies a user.

An editing device, an editing method, and a program according to the present invention adopt the following configurations.

(1): According to an aspect of the present invention, an editing device is provided including: a memory configured to store instructions; and one or more processors configured to execute the instructions to: acquire a first image in which an occupant of a vehicle has been imaged in association with a time point in a time series and a second image in which scenery around the vehicle has been imaged in association with a time point in a time series, acquire first index information indicating feelings of the occupant when the first image has been captured on the basis of the first image, and extract the first image and the second image from first images of the time series and second images of the time series on the basis of the first index information and the time point associated with the first image based on the first index information to generate a library including the extracted images.

(2): In the above-described aspect (1), wherein the instructions further comprise instructions to: cause a storage to store the first images of the time series and the second images of the time series, and extract the first image and the second image from the first images of the time series and the second images of the time series stored in the storage on the basis of the first index information and the time point to generate a library including the extracted images.

(3): In the above-described aspect (1) or (2), wherein the instructions further comprise instructions to: extract the first image based on the first index information associated with positive feelings and the second image captured at the time point associated with the first image to generate a library including the extracted images.

(4): In any one of the above-described aspects (1) to (3), wherein the instructions further comprise instructions to: extract the first image and the second image on the basis of second index information associated with a position where the vehicle has traveled, the first index information, and the time point to generate a library including the extracted images.

(5): In any one of the above-described aspects (1) to (4), wherein the instructions further comprise instructions to: cause a display of the vehicle to display an edited image that has been edited and including the extracted images.

(6): In any one of the above-described aspects (1) to (5), wherein the instructions further comprise instructions to: start editing a predetermined time period or a predetermined distance before the vehicle arrives at a destination and end editing before the vehicle arrives at the destination.

(7): In any one of the above-described aspects (1) to (6), wherein the instructions further comprise instructions to: cause a display of the vehicle to display an edited image that has been edited and including the extracted images, start editing a first predetermined time point or a first predetermined distance before the vehicle arrives at a destination, end editing at a second predetermined time point or a second predetermined distance before the vehicle arrives at the destination, and allow to display the edited image until the vehicle arrives at the destination after editing is end.

(8): In any one of the above-described aspects (1) to (7), wherein the instructions further comprise instructions to: acquire the first index information indicating the feelings of the occupant when the first image has been captured on the basis of a facial expression of the occupant included in the first image.

(9): In any one of the above-described aspects (1) to (8), wherein the instructions further comprise instructions to: acquire speech information indicating speech uttered by the occupant of the vehicle in association with a time point in a time series, acquire third index information indicating feelings of the occupant when the first image has been captured on the basis of the speech information, and extract the first image and the second image from the first images and the second images of the time series on the basis of the third index information, the first index information, and the time point associated with the first image based on the first index information to generate a library including the extracted images.

(10): According to an aspect of the present invention, a memory configured to store instructions; and one or more processors configured to execute the instructions to: acquire a first image in which an occupant of a vehicle has been imaged in association with a time point in a time series, a second image in which scenery around the vehicle has been imaged in association with a time point in a time series, and speech information indicating speech uttered by the occupant of the vehicle in association with a time point in a time series, acquire index information indicating feelings of the occupant when the speech of the speech information has been uttered on the basis of the speech information, and extract the first image and the second image from first images of the time series and second images of the time series on the basis of the index information and the time point associated with the speech information based on the index information to generate a library including the extracted images.

(11): According to an aspect of the present invention, an editing method is provided including: acquiring, by a computer, a first image in which an occupant of a vehicle has been imaged in association with a time point in a time series and a second image in which scenery around the vehicle has been imaged in association with a time point in a time series, acquiring, by the computer, first index information indicating feelings of the occupant when the first image has been captured on the basis of the first image, and extracting, by the computer, the first image and the second image from first images of the time series and second images of the time series on the basis of the first index information and the time point associated with the first image based on the first index information to generate a library including the extracted images.

(12): According to an aspect of the present invention, a non-transitory computer-readable storage medium causing a computer to: acquire a first image in which an occupant of a vehicle has been imaged in association with a time point and a second image in which scenery around the vehicle has been imaged in association with a time point in a time series; acquire first index information indicating feelings of the occupant when the first image has been captured on the basis of the first image; and extract the first image and the second image from first images of the time series and second images of the time series on the basis of the first index information and the time point associated with the first image based on the first index information to generate a library including the extracted images.

According to the aspects (1) to (9), (11), and (12), the editing device can generate a library satisfying the user by extracting the first image and the second image from the first images and the second images of the time series on the basis of the first index information and the time point associated with the first image based on the first index information.

According to the aspect (3), the editing device can generate a library more satisfactory to the user because the library including the first image based on the first index information associated with positive feelings and the second image captured at the time point associated with the first image is generated.

According to the aspect (4), the editing device can generate a library in consideration of characteristics of a traveling area by adding the second index information associated with a position where the vehicle has traveled.

According to the aspect (5), because the editing device causes the display of the vehicle to display the edited image, the user can look back on his/her memories.

According to the aspect (6), because the editing device ends editing before the vehicle arrives at the destination, the occupant can see the edited image immediately after arriving at the destination.

According to the aspect (7), because the editing device ends editing at the predetermined time point or the second predetermined distance before the vehicle arrives at the destination and causes the display to display the edited image until the vehicle arrives at the destination from the predetermined time point, the occupant can look back on, for example, the memories of the day until the vehicle arrives at the destination.

According to the aspect (9), the editing device can generate a library more satisfactory to the user by generating the library in consideration of speech.

According to the aspect (10), the editing device can generate a library more satisfactory to the user by extracting the first image and the second image from the first images and the second images of the time series on the basis of the index information obtained from the speech uttered by the occupant of the vehicle and the time point associated with the speech information that is information of the speech based on the index information.

DETAILED DESCRIPTION

Hereinafter, embodiments of an editing device, an editing method, and a program of the present invention will be described with reference to the drawings.

First Embodiment

Vehicle System

Figure 1:
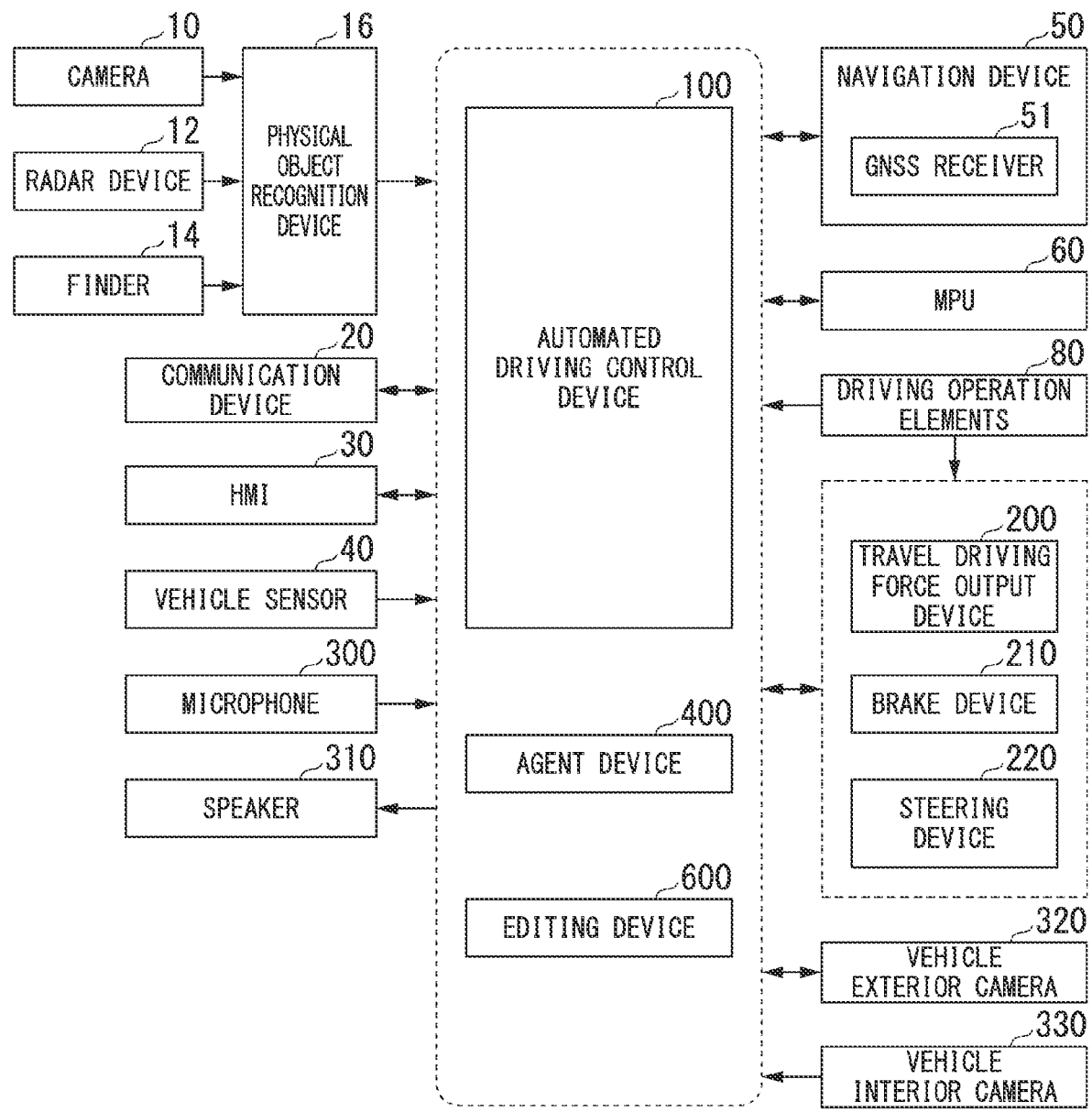
FIG. 1 is a configuration diagram of a vehicle system.

FIG. 1 is a configuration diagram of a vehicle system 1. A vehicle equipped with the vehicle system 1 is, for example, a vehicle such as a two-wheeled vehicle, a three-wheeled vehicle, or a four-wheeled vehicle. For example, the vehicle system 1 includes a camera 10, a radar device 12, a finder 14, a physical object recognition device 16, a communication device 20, a human machine interface (HMI) 30, a vehicle sensor 40, a navigation device 50, a map positioning unit (MPU) 60, a driving operation element 80, an automated driving control device 100, a travel driving force output device 200, a brake device 210, a steering device 220, a microphone 300, a speaker 310, a vehicle exterior camera 320, a vehicle interior camera 330, an agent device 400, an editing device 600, and the like.

Such devices and equipment are connected to each other through a multiplex communication line such as a controller area network (CAN) communication line, a serial communication line, or a wireless communication network. The configuration shown in FIG. 1 is merely an example and parts of the configuration may be omitted or other configurations may be further added.

For example, the camera 10 is a digital camera using a solid-state imaging element such as a charge coupled device (CCD) or a complementary metal oxide semiconductor (CMOS). The camera 10 is attached to any position on the vehicle (hereinafter, a vehicle M) in which the vehicle system 1 is mounted. The radar device 12 radiates radio waves such as millimeter waves around the vehicle M and detects at least a position (a distance to and a direction) of a physical object by detecting radio waves (reflected waves) reflected by the physical object. The finder 14 is a light detection and ranging (LIDAR) finder. The finder 14 radiates light to the vicinity of the vehicle M and measures scattered light. The finder 14 detects a distance to an object on the basis of a time period from light emission to light reception.

The physical object recognition device 16 performs a sensor fusion process on detection results from some or all of the camera 10, the radar device 12, and the finder 14 to recognize a position, a type, a speed, and the like of a physical object. The physical object recognition device 16 outputs recognition results to the automated driving control device 100.

The communication device 20 communicates with another vehicle present in the vicinity of the vehicle M using, for example, a network NW, Bluetooth (registered trademark), dedicated short range communication (DSRC), or the like or communicates with various types of server devices via a wireless base station.

The HMI 30 presents various types of information to the occupant of the vehicle M and accepts an input operation of the occupant. The HMI 30 includes various types of display devices, a speaker, a buzzer, a touch panel, a switch, keys, and the like.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like.

For example, the navigation device 50 includes a global navigation satellite system (GNSS) receiver 51, a navigation HMI (not shown), and a route determiner (not shown). The GNSS receiver 51 identifies a position of the vehicle M on the basis of a signal received from a GNSS satellite. The navigation HMI includes a display device, a speaker, a touch panel, keys, and the like. The navigation HMI may be partly or wholly shared with the above-described HMI 30. For example, the route determiner determines a route (hereinafter referred to as a route on a map) from the position of the vehicle M identified by the GNSS receiver 51 (or any input position) to a destination input by the occupant using the navigation HMI 52 with reference to first map information 54 described in a storage device. The first map information is, for example, information in which a road shape is expressed by a link indicating a road and nodes connected by the link. The first map information 54 may include a curvature of a road, point of interest (POI) information, and the like.

For example, the MPU 60 divides the route on the map provided from the navigation device 50 into a plurality of blocks (for example, divides the route every 100 [m] in a traveling direction of the vehicle), and determines a recommended lane for each block with reference to second map information 62 described in a storage device. A recommended lane determiner 61 determines what number lane the vehicle travels in from the left. The second map information is map information which has higher accuracy than the first map information 54. For example, the second map information may include information about a center of a lane, information about a boundary of a lane, traffic regulations information, address information (an address/postal code), facility information, telephone number information, and the like.

For example, the driving operation elements 80 include an accelerator pedal, a brake pedal, a shift lever, a steering wheel, a steering wheel variant, a joystick, and other operation elements. A sensor configured to detect an amount of operation or the presence or absence of an operation is attached to the driving operation element 80, and a detection result thereof is output to the automated driving control device 100 or some or all of the travel driving force output device 200, the brake device 210, and the steering device 220.

For example, the automated driving control device 100 performs a process when a hardware processor such as a central processing unit (CPU) executes a program (software). Some or all of the components of the automated driving control device 100 may be implemented, for example, by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device such as an HDD or a flash memory of the automated driving control device 100 (a storage device including a non-transitory storage medium) or may be stored in a removable storage medium such as a DVD or a CD-ROM and installed in the HDD or the flash memory of the automated driving control device 100 when the storage medium (the non-transitory storage medium) is mounted in a drive device.

The automated driving control device 100 recognizes states such as a position, a speed, acceleration, and the like of a physical object around the vehicle M on the basis of information input via the physical object recognition device 16. The automated driving control device 100 generates a future target trajectory along which the vehicle M automatically travels (independently of an operation of a driver) so that the vehicle M can generally travel in the recommended lane determined by the MPU 60 and further cope with a surrounding situation of the vehicle M. For example, the target trajectory includes a speed element. For example, the target trajectory is represented by sequentially arranging points (trajectory points) at which the vehicle M is required to arrive.

The automated driving control device 100 may set an automated driving event when the target trajectory is generated. Automated driving events include a constant-speed traveling event, a low-speed tracking event, a lane change event, a branching event, a merging event, a takeover event, an automated parking event, and the like. The automated driving control device 100 generates a target trajectory according to an activated event.

The automated driving control device 100 controls the travel driving force output device 200, the brake device 210, and the steering device 220 so that the vehicle M passes through the generated target trajectory at a scheduled time point. The automated driving control device 100 controls the travel driving force output device 200 or the brake device 210 on the basis of the speed element associated with the target trajectory (trajectory point) or controls the steering device 220 in accordance with a degree of curvature of the target trajectory.

The travel driving force output device 200 outputs a travel driving force (torque) for driving the vehicle to the drive wheels. For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the automated driving control device 100 or the information input from the driving operation element 80 so that brake torque according to a braking operation is output to each wheel. For example, the steering device 220 includes a steering ECU and an electric motor. For example, the electric motor changes a direction of steerable wheels by applying a force to a rack and pinion mechanism. The steering ECU drives the electric motor to change the direction of the steerable wheels in accordance with the information input from the automated driving control device 100 or the information input from the driving operation element 80.

Speech uttered by the occupant is input to the microphone 300. The microphone 300 outputs information based on the input speech to the agent device 400. The speaker 310 outputs speech based on the information generated by the automated driving control device 100 or the agent device 400.

The vehicle exterior camera 320 is a camera that images the scenery outside the vehicle. The vehicle exterior camera may be a movable camera that is movable on the basis of an instruction of the editing device 600 and controls an imaging direction.

The vehicle interior camera 330 is a camera provided within the vehicle of the vehicle M and mainly images the user's face. The vehicle interior camera 330 may be a camera that images an occupant sitting in a specific seat or may be a camera that images a plurality of occupants present within the vehicle interior.

Agent Device

The agent device 400 interacts with the occupant of the vehicle M and provides services to the occupant. Services include services associated with the provision of information and the use of facilities at a destination (for example, the reservation of seats at a restaurant or ordering of food) and the like. The agent device 400 recognizes the speech of the occupant, selects information to be provided to the occupant on the basis of a recognition result and causes the HMI 30 to output the selected information. Some or all of the above functions may be implemented by artificial intelligence (AI) technology. The agent device 400 may interact with the occupant or provide the service in cooperation with an agent server device (not shown) via the network NW.

For example, the agent device 400 performs various types of processes when a hardware processor such as a CPU executes a program (software). Some or all of the above components may be implemented, for example, by hardware (a circuit including circuitry) such as an LSI circuit, an ASIC, an FPGA, or a GPU or may be implemented by software and hardware in cooperation. The program may be pre-stored in a storage device such as an HDD or a flash memory (a storage device including a non-transitory storage medium) or may be stored in a removable storage medium such as a DVD or a CD-ROM (the non-transitory storage medium) and installed when the storage medium is mounted in a drive device.

Editing Device

Figure 2:
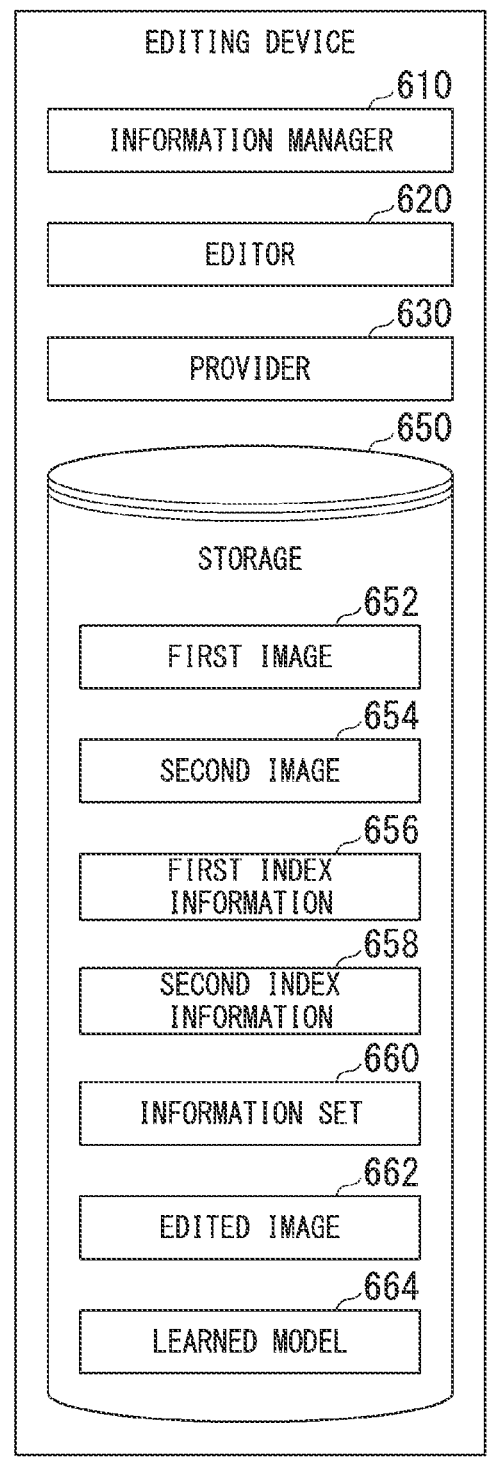
FIG. 2 is a diagram showing an example of a functional configuration of an editing device.

FIG. 2 is a diagram showing an example of a functional configuration of the editing device 600. The editing device 600 includes, for example, an information manager 610, an editor 620, a provider 630, and a storage 650. The information manager 610, the editor 620, and the provider 630 are implemented by, for example, a hardware processor such as a CPU executing a program (software). Some or all of the above components may be implemented, for example, by hardware (a circuit including circuitry) such as an LSI circuit, an ASIC, an FPGA, or a GPU or may be implemented by software and hardware in cooperation. The program may be pre-stored in a storage device such as an HDD or a flash memory of the editing device 600 (a storage device including a non-transitory storage medium) or may be stored in a removable storage medium such as a DVD or a CD-ROM and installed in the HDD or the flash memory of the editing device 600 when the storage medium (the non-transitory storage medium) is mounted in a drive device.

The storage 650 is implemented by, for example, an HDD, a flash memory, an electrically erasable programmable read only memory (EEPROM), a read only memory (ROM), a random access memory (RAM), or the like. A program for the editing device 600 to execute the process or the like is stored in the storage 650.

The storage 650 stores, for example, a first image 652, a second image 654, first index information 656, second index information 658, an information set 660, an edited image 662, and a learned model 664. Information stored in the storage 650 and details of the learned model 664 will be described below.

The information manager 610 acquires the first image 652 in which the occupant of the vehicle M is imaged in association with a time point and the second image 654 in which the scenery around the vehicle M is imaged in association with a time point in time-series order. The information manager 610 acquires the first index information indicating feelings of the occupant when the first image 652 is captured on the basis of the first image 652.

The editor 620 extracts the first image 652 and the second image 654 from first images 652 and second images 654 of the time series on the basis of the first index information and the time point associated with the first image 652 based on the first index information to generate a library including the extracted images.

The provider 630 causes the display (for example, the HMI 30) of the vehicle M to display the edited image that has been edited by the editor 620. The provider 630 provides the edited image to a designated terminal device (for example, a smartphone). Details of the information manager 610, the editor 620, and the provider 630 will be described below.

Figure 3:
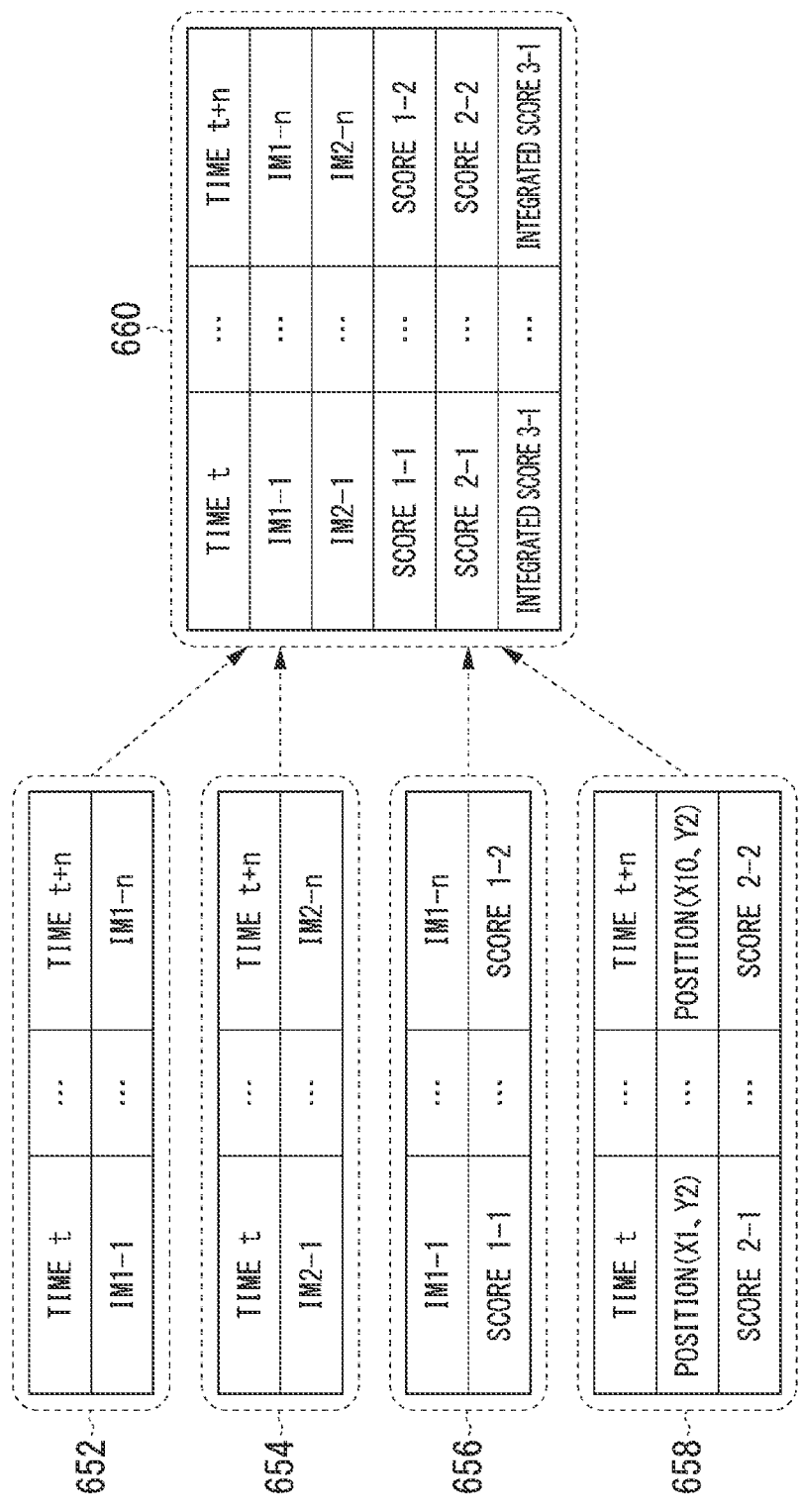
FIG. 3 is a diagram showing an example of information stored in a storage.

FIG. 3 is a diagram showing an example of information stored in the storage 650. The first image 652 is an image captured by the vehicle interior camera 330 in a time series. A time point is associated with the first image 652. The second image 654 is an image captured by the vehicle exterior camera 320 in a time series. A time point is associated with the second image 654.

The first index information 656 is a first score indicating feelings of the occupant obtained on the basis of the first image 652. For example, the first score is determined on the basis of a facial expression of the imaged occupant included in the first image 652. A determination is made such that the first score tends to be higher when the occupant of the first image 652 is more positive. Positive feelings are feelings such as pleasure, joy, fun, excitement, and surprise. A determination may be made such that the first score tends to increase as the feelings are negative or set feelings instead of (or in addition to) a process of making a determination such that the first score tends to be higher when the occupant is more positive.

The second index information 658 is the second score associated with position information. For example, the second index information 658 is information provided by another device or information included in the map information. For example, in the second index information 658, a second score higher than those of other areas is set for a tourist spot, an area with beautiful scenery, a famous place, or an area (a place) in which a visitor is interested. In the second index information 658, a second score higher than those of other areas may be set for an area recommended by a predetermined person or acquaintance via the network NW or the like. In other words, a second score higher than those of other areas is set for an area where the feelings of the occupant are likely to be positive when the occupant passes near the area. A second score higher than those of other areas may be set for an area where feelings of the occupant are likely to be negative or set feelings instead of (in addition to) an area where feelings of the occupant are likely to be positive when the occupant passes near the area.

The information set 660 is information in which the first image 652, the second image 654, the first score, the second score, and the integrated score are associated with the time point. The integrated score is, for example, a score obtained by statistically processing the first score of the first index information 656 and the second score of the second index information 658 associated with the images at the same time point. The integrated score may be a sum of the first score and the second score or a score obtained by making a weight of the first score higher than a weight of the second score (or a score obtained by making the weight of the second score heavier than the weight of the first score).

The edited image 662 includes one or both of the first image 652 and the second image 654 whose integrated score is greater than or equal to a threshold value. Details will be described below.

Method of Acquiring First Images and Second Images

Figure 4:
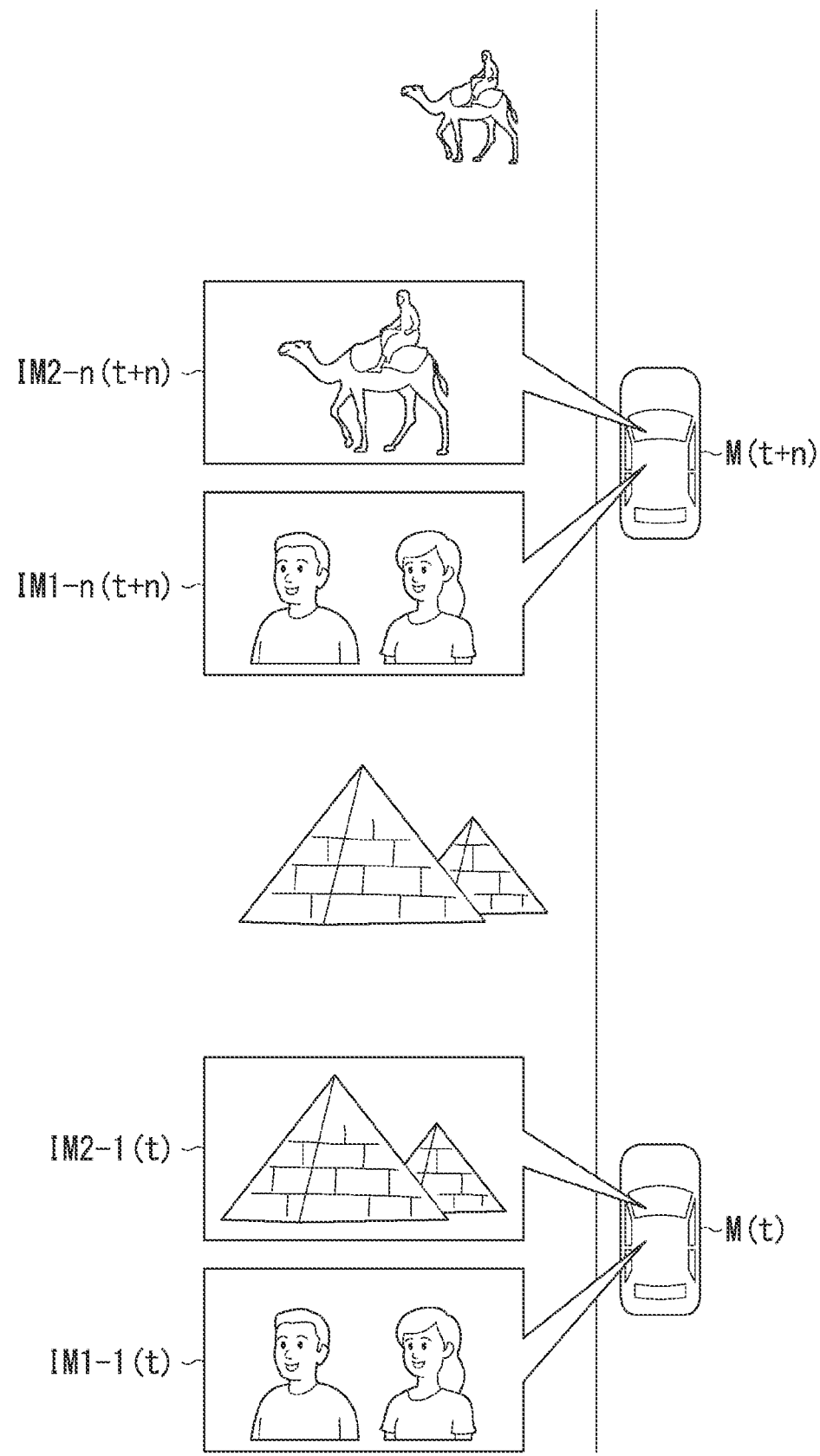
FIG. 4 is a diagram showing an example of a method of acquiring a first image and a second image.

FIG. 4 is a diagram showing an example of a method of acquiring first images 652 and second images 654. The information manager 610 acquires first images 652 and second images 654 of a time series. As shown in FIG. 4, the information manager 610 acquires the first image 652 and the second image 654 at time t and acquires the first image 652 and the second image 654 at time t+n. In the example shown in FIG. 4, the second image 654 at time t is an image in which a pyramid is imaged and the first image 652 at time t is an image of an occupant who is pleased to see the pyramid. The second image 654 at time t+n is an image in which a camel is imaged and the first image 652 at time t+n is an image of the occupant who is pleased to see the camel. As described above, the information manager 610 acquires the images captured in a time series and causes the storage 650 to store the acquired images.

Method of Obtaining First Score from First Image

Figure 5:
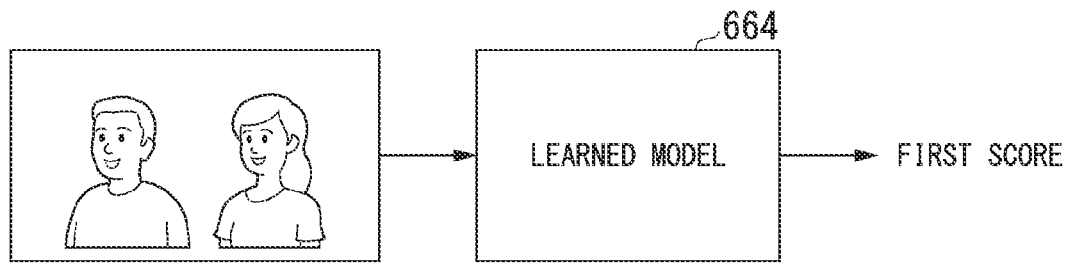
FIG. 5 is a diagram showing an example of a method of obtaining a first score from the first image.

FIG. 5 is a diagram showing an example of a method of obtaining a first score from the first image 652. The information manager 610 acquires first index information indicating feelings of the occupant when the first image 652 has been captured on the basis of a facial expression of the occupant included in the first image 652 as follows. The information manager 610 derives the first score from the first image 652 using the learned model 664. The learned model 664 is a model in which a neural network or the like has been used. The learned model 664 is a model generated by learning learning data. The learning data is information in which the first score and the image in which the occupant's face is imaged are associated with each other. The learned model 664 is a model that has been learned so that a first score associated with an input image is output when the image of the occupant's face is captured. The information manager 610 inputs the first image 652 to the learned model 664 and acquires the first score output by the learned model 664. For example, when an image in which the occupant smiles is input, the learned model 664 outputs a first score higher than a first score that is output when an image in which the occupant does not smile is input.

The information manager 610 may analyze the first image 652 and acquire the first score without using the learned model 664. For example, the information manager 610 may compare a template with a predetermined area of the first image 652 and acquire the first score on the basis of a degree of matching between the template and the predetermined area. The template is, for example, a feature quantity obtained from an area including the corners of the mouth or the outer corners of the eyes of the occupant in an image in which a smiling occupant (or person) has been imaged. The feature quantity is, for example, a luminance distribution or a luminance gradient distribution. An output result of the learned model 664 and a processing result of template matching may be integrated to obtain the first score.

Method of Obtaining Second Score

Figure 6:
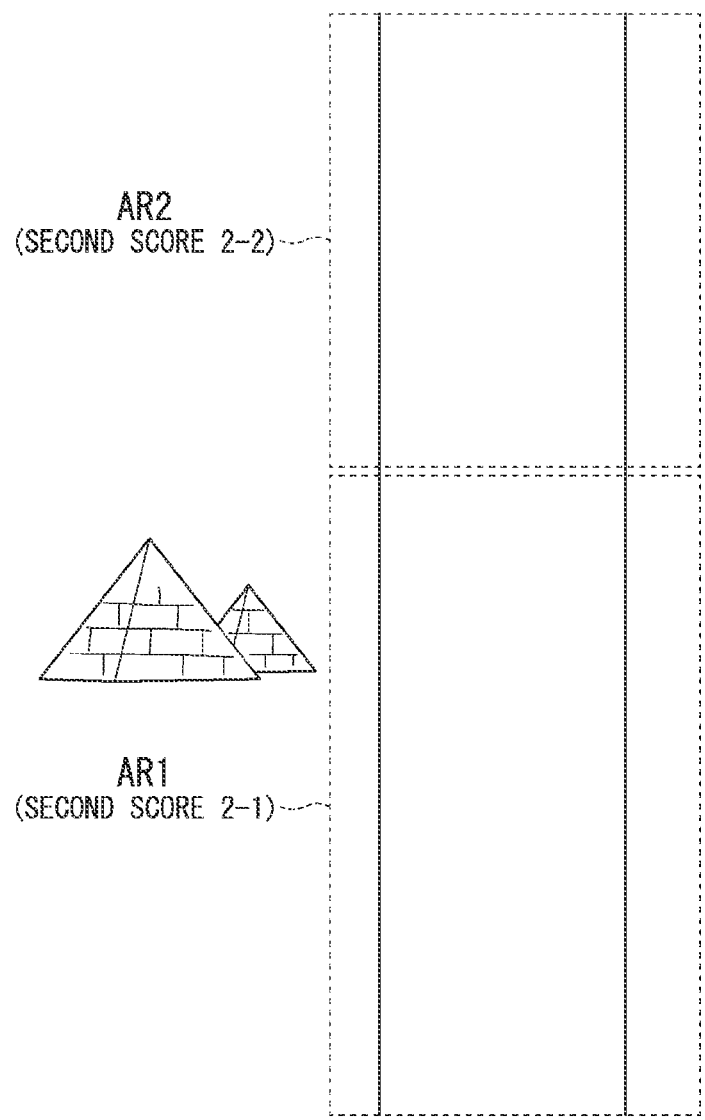
FIG. 6 is a diagram for describing a method of obtaining a second score.

FIG. 6 is a diagram for describing a method of obtaining a second score. The information manager 610 acquires the second score with reference to the second index information 658. The second index information 658 is information in which the second score is associated with each predetermined area. For example, a second score 2-1 is associated with an area AR1 and a second score 2-2 is associated with an area AR2.

The second score 2-1 is higher than the second score 2-2. This is because when the vehicle M is present in the area AR1, the occupant can see the pyramid and the occupant is likely to be pleased.

The second score may be modified on the basis of a past behavior history of the occupant or vehicle. For example, the past action history is stored in the storage 650. The information manager 610 refers to the past behavior history and may set the second score of the area to a score lower than a predetermined score or zero when the degree of visits to the area in the past is higher than or equal to a predetermined degree (the number of visits is greater than or equal to a predetermined number of times). Thereby, a process in which an edited image includes an image of an area that the occupant has visited in the past is limited. The occupant may be identified through image processing or may be identified by information for identifying the occupant provided from the occupant to the editing device 600.

The second score may be derived in real time. For example, the information manager 610 may derive the second score on the basis of an image captured by the vehicle exterior camera 320. For example, a second score higher than those of other sceneries is derived for an image (a specific image) in which scenery estimated to make the occupant happy or surprised is imaged such as an image that is captured when the sunset is beautiful or an image in which a rainbow is imaged. For example, the information manager 610 derives a second score of a predetermined value or more for an image having a contrast satisfying a predetermined standard or an image containing a preset feature quantity. When a specific image is input, the information manager 610 may derive a second score using a learned model that outputs a second score greater than or equal to a predetermined value.

Method of Extracting Image from Integrated Score

Figure 7:
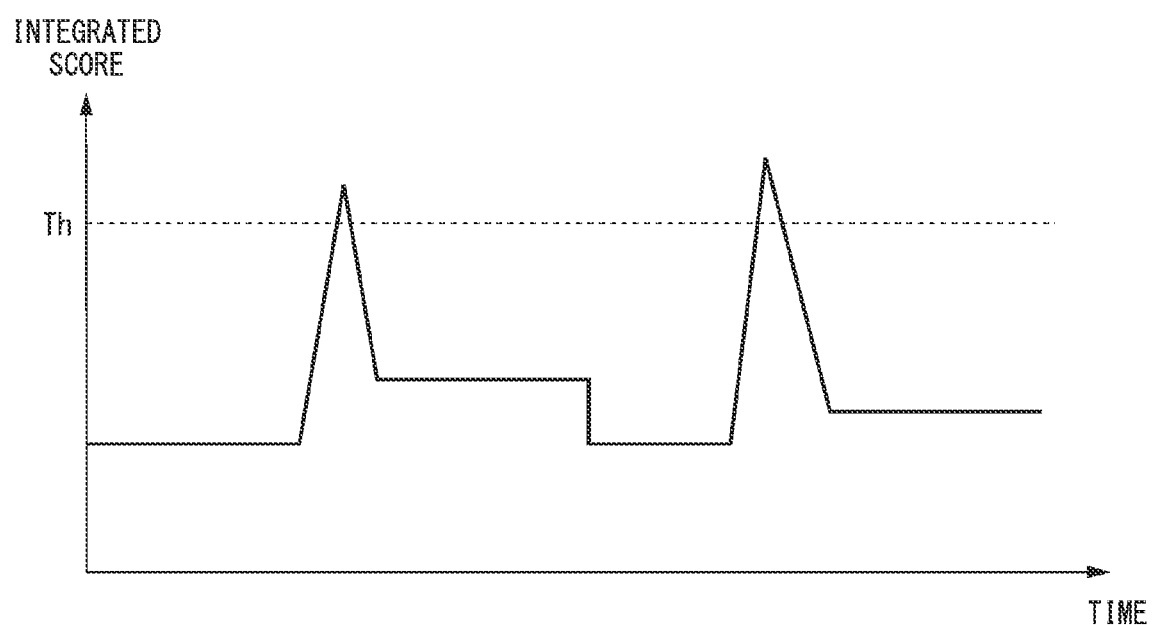
FIG. 7 is a diagram showing an example of an integrated score expressed in time-series order.

FIG. 7 is a diagram showing an example of an integrated score expressed in time-series order. The vertical axis of FIG. 7 represents a magnitude of an integrated score in which the first score and the second score are integrated and the horizontal axis of FIG. 7 represents time. For example, the editor 620 extracts a time point corresponding to an integrated score greater than or equal to a threshold value Th (hereinafter referred to as an extraction time point). The time point of the integrated score greater than or equal to the threshold value Th is a time point at which it is estimated that the occupant was pleased.

Figure 8:
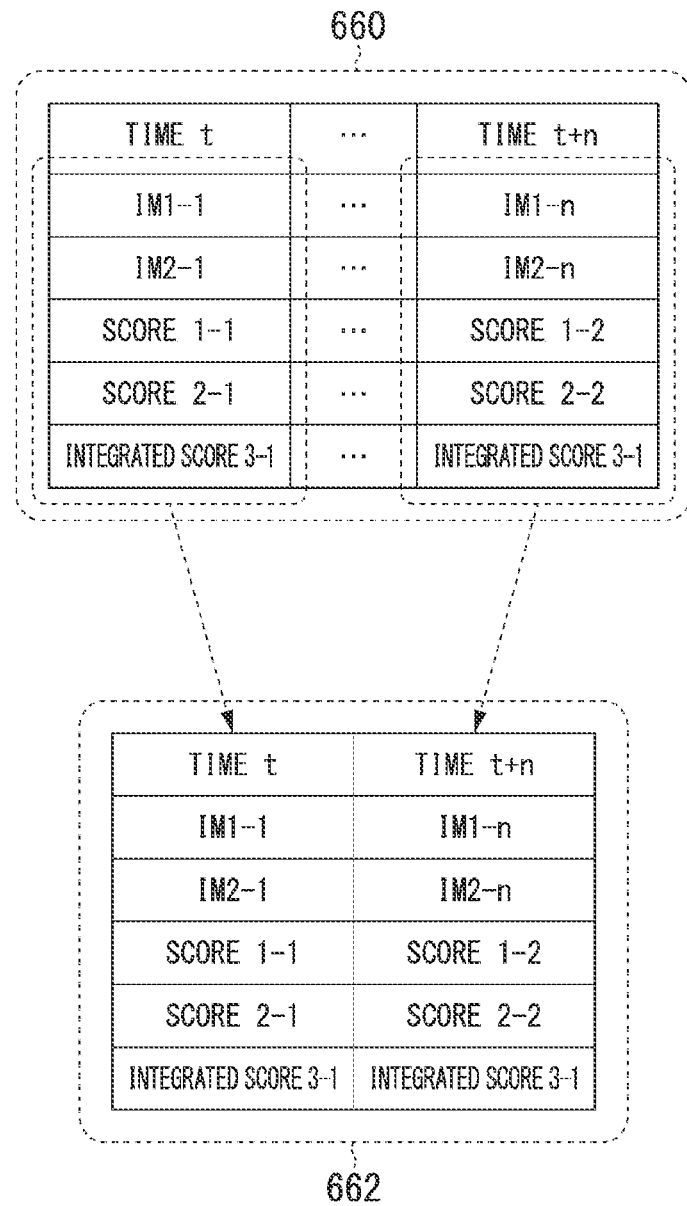
FIG. 8 is a diagram for describing the extraction of the first image and the second image.

As shown in FIG. 8, the editor 620 extracts the first image 652 and the second image 654 associated with the extracted time point from the information set 660 and includes the first image 652 and the second image 654 that have been extracted in the edited image 662. Thus, the edited image 662 is generated.

Provision of Edited Image

Figure 9:
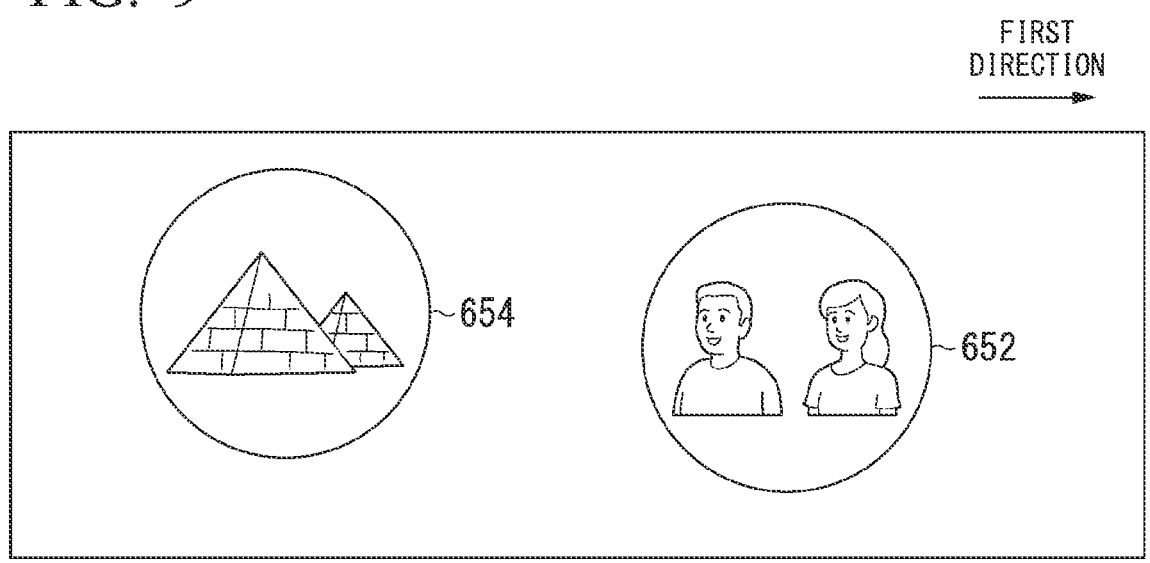
FIG. 9 is a diagram showing examples of the first image and the second image displayed on a display.

The provider 630 causes the display (the HMI 30) of the vehicle M to display the edited image. FIG. 9 is a diagram showing an example of the first image 652 and the second image 654 displayed on the display. For example, each of the first image 652 and the second image 654 may be displayed to be included in, for example, an image showing a bubble. As shown in FIG. 9, the first image 652 and the second image 654 are simultaneously displayed on the display. The bubble including the first image 652 or the second image 654 moves in a first direction (for example, a right direction) and an image may be generated so that another first image 652 or another second image 654 moves to an empty area after the first image 652 or the second image 654 moves. An image that disappears when bubbles float may be displayed on the display. When the image has been manipulated, an image captured before or after the time point when the image has been captured and detailed information such as information of a tourist spot associated with the image may be displayed on the display. Further, the edited image may include information about a passenger (for example, age, birthday, and the like) and information about occupants may be displayed on the display.

Although a case in which an image is provided to the occupant has been described in the above-described example, a moving image may be provided to the occupant. In this case, the vehicle exterior camera 320 or the vehicle interior camera 330 acquires the moving image and the editing device 600 edits the moving image.

As described above, images of a predetermined process, memories of the day, and things that users enjoyed are displayed on the display like a flash, so that the users can look back on their memories and enjoy their memories or vividly imprint their memories.

The editing device 600 edits the acquired image or moving image as described above to generate an edited image (an edited moving image). For example, the editing device 600 edits an image (a moving image including an image or a moving image) on the basis of information about passengers and the behavior of the day like a short movie and provides the edited image or the like to the passengers, thereby providing a service that allows the passengers to look back on events, experiences, or the like of the day like a flash. Thereby, the memory of the experience within the vehicle remains vivid for the occupants. By sharing the edited image or the edited moving image with others, it is also used as a tool for sharing the experience with others. Thereby, the motivation of occupants to experience more is improved and the utilization of vehicles is promoted.

Timing at Which Provision of Edited Image Starts

The editor 620 starts editing a predetermined time period or a predetermined distance before the vehicle M arrives at a destination and ends the editing before the vehicle M arrives at the destination. The destination is, for example, a destination preset by the occupant. The destination is, for example, home or an accommodation facility at a travel destination or the like. As described above, if the editing is completed before the vehicle arrives at the destination, the occupant can see the edited image at the destination immediately after arriving at the destination.

Figure 10:
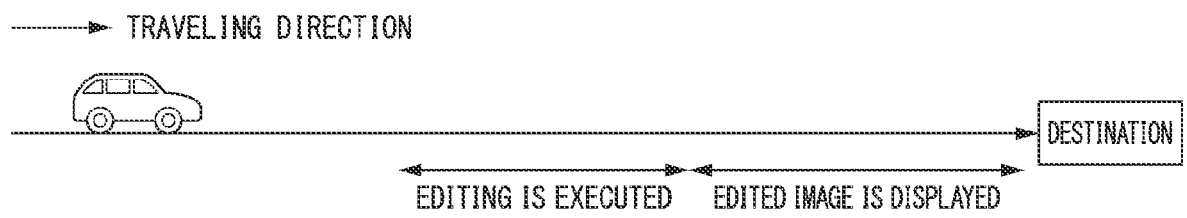
FIG. 10 is a diagram for describing a timing for starting an edited image.

FIG. 10 is a diagram for describing a timing for starting the edited image. The editor 620 may start editing a predetermined time period or a first predetermined distance before the vehicle M arrives at a destination and further end editing at a predetermined time point or a second predetermined distance before the vehicle M arrives at the destination. The provider 630 causes the HMI 30 to display the edited image until the vehicle M arrives at the destination from the predetermined time point or the time before the second predetermined distance. As described above, the editing device 600 can edit the image so that the edited image can be displayed on the display until the vehicle heads to a destination after a one-day process or a predetermined process is completed and can show the edited image to the occupant until the vehicle heads to the destination. For example, the editor 620 sets a start time point of editing on the basis of the number of acquired images and ends editing before a process of causing the display to display the edited image is started.

Thereby, the occupant can look back on memories of a predetermined process or imprint the memories until he/she arrives at the destination.

Flowchart

Figure 11:
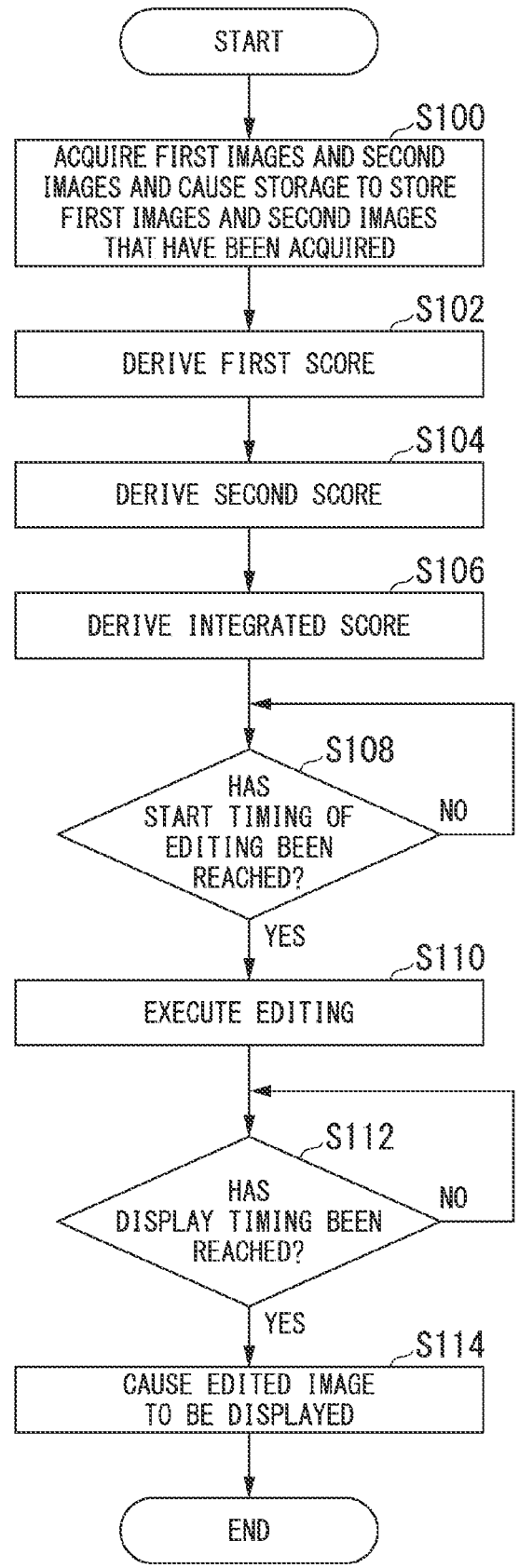
FIG. 11 is a flowchart showing an example of a flow of a process executed by the editing device.

FIG. 11 is a flowchart showing an example of a flow of a process executed by the editing device 600. First, the information manager 610 acquires first images 652 and second images 654 at predetermined intervals and causes the storage 650 to store the acquired images (step S100). Subsequently, the information manager 610 derives a first score on the basis of the first image 652 (step S102) and derives a second score on the basis of a position of the vehicle M at a time point when the first image 652 has been captured (step S102). Subsequently, the information manager 610 derives an integrated score on the basis of the first score and the second score (step S106).

Subsequently, the editor 620 determines whether or not a start timing of editing has been reached (step S108) and executes editing when a start timing of editing has been reached (step S110). Subsequently, the provider 630 determines whether or not a timing for causing the display to display the edited image has been reached (step S112) and the edited image is displayed on the display when the timing has been reached (step S114). Thereby, the process of one routine of the present flowchart is completed.

As described above, because the editing device 600 causes the display to display the first image 652 and the second image 654 when the occupant is in a predetermined state (for example, a smile) at a predetermined timing, so that the user's satisfaction level is improved.

For example, because the agent device 400 is mounted in the vehicle M and the communication technology or the automated driving technology has developed, a time period in which activities within the vehicle are enjoyed has increased. There is a high possibility that activities and events within the vehicle will be remembered as memories. The editing device 600 can provide the occupant with an image of the occupant when an activity within the vehicle is performed or an event occurs and an image of scenery outside the vehicle as a memory.

Although the use of the second score has been described in the above example, the use of the second score may be omitted. In this case, the editing device 600 extracts the first image 652 and the second image 654 on the basis of the first score. The first score may be omitted and the first image 652 and the second image 654 may be extracted on the basis of the second score.

According to the above-described first embodiment, the editing device 600 extracts the first image 652 and the second image 654 from the first images 652 and the second images 654 of the time series on the basis of first index information and the first image 652 based on the first index information and generates a library including the extracted images, so that the library satisfying the user can be generated.

Second Embodiment

Hereinafter, a second embodiment will be described. In the second embodiment, a third score (third index information) based on speech is added in addition to the image. Hereinafter, the second embodiment will be described.

Figure 12:
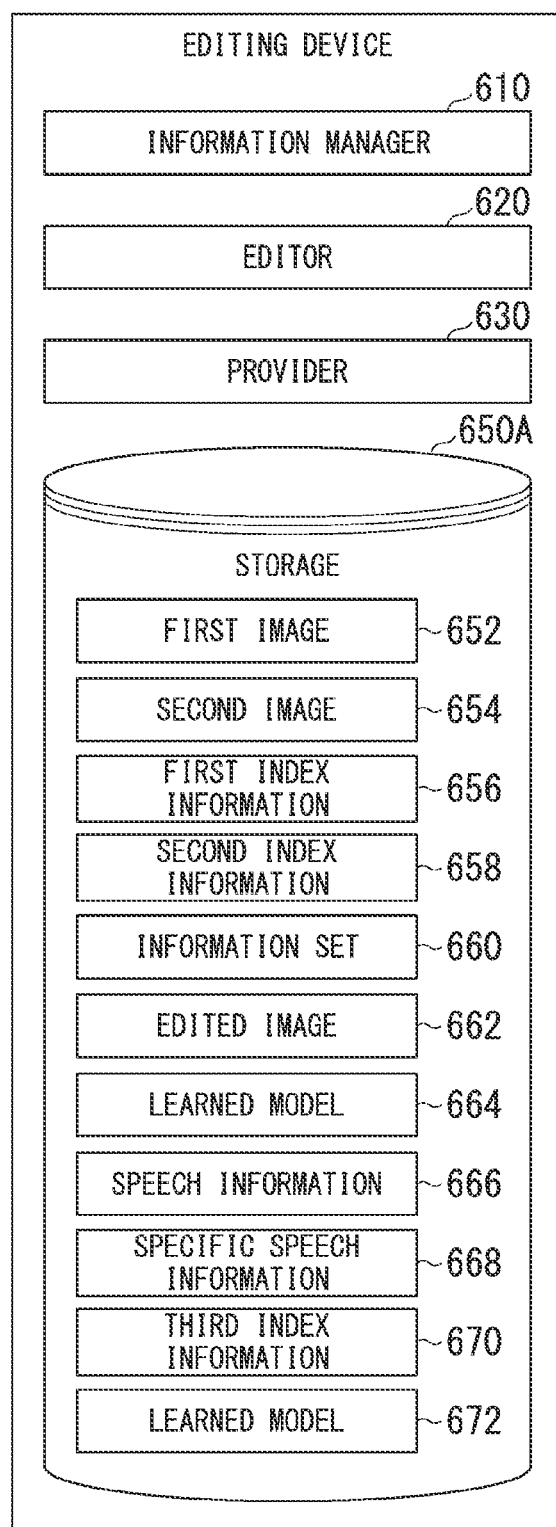
FIG. 12 is a diagram showing an example of a functional configuration of an editing device according to a second embodiment.

FIG. 12 is a diagram showing an example of a functional configuration of an editing device 600A according to the second embodiment. The editing device 600A includes, for example, an information manager 610, an editor 620, a provider 630, and a storage 650A. The provider 630 has a function similar to that of the provider 630 of the first embodiment.

In the storage 650A, speech information 666, specific speech information 668, third index information 670, and a learned model 672 are stored in addition to the information stored in the storage 650 of the first embodiment. The speech information 666 is information indicating the speech input to the microphone 300. A time point is associated with the information indicating the speech. The specific speech information 668 is a preset keyword or preset specific speech. The keyword is a word that is uttered when the occupant is pleased or impressed, such as "amazing," "nice," or "beautiful." The specific speech is speech that appears when laughter or a conversation is lively.

The information manager 610 determines a degree of matching between the speech (or information based on the speech) included in the speech information 666 and the speech (or the keyword) included in the specific speech information, and derives the third score on the basis of the degree of matching. For example, when the degree of matching is higher, a higher third score tends to be derived. The information manager 610 may derive the third score using the learned model 672.

The learned model 672 is a model using a neural network or the like. The learned model 672 is a model generated by learning the learning data. The learning data is information in which the third score and the information indicating the speech are associated with each other. The learned model is a model that has been learned so that when the information indicating the speech is input, the third score associated with the information indicating the input speech is output. The information manager 610 may integrate (for example, statistically process) the score derived using the learned model 672 and the score derived on the basis of the degree of matching to derive the final third score. The third score is stored in the storage 650B as the third index information 670.

Flowchart

Figure 13:
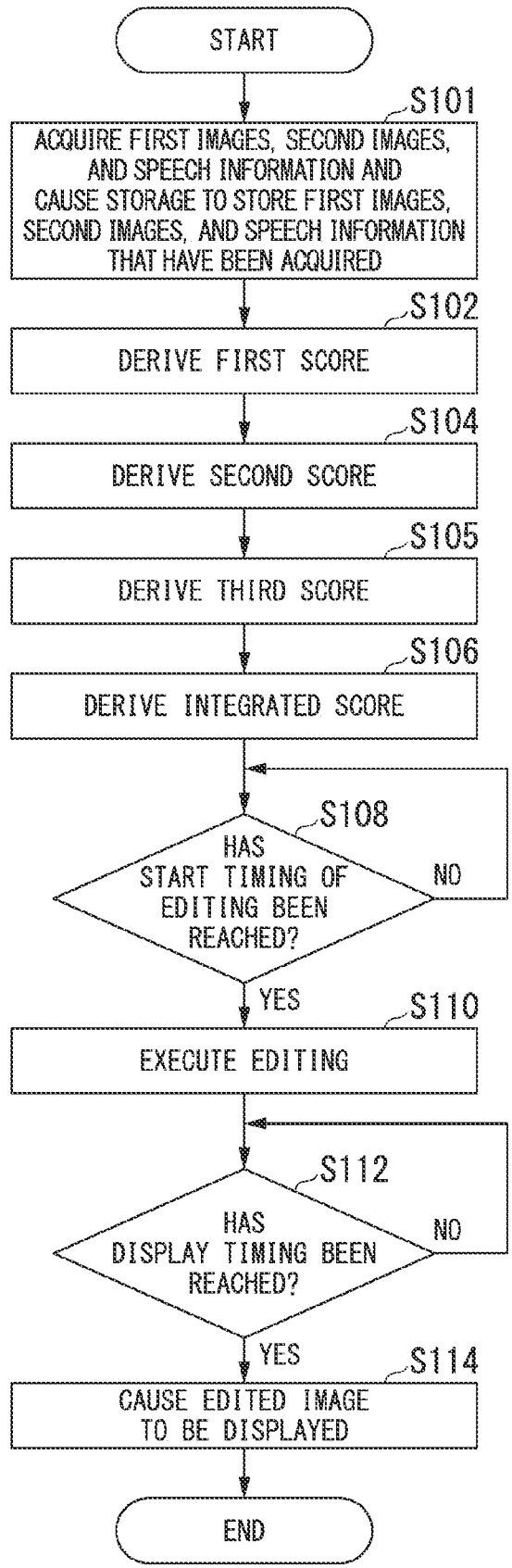
FIG. 13 is a flowchart showing an example of a flow of a process executed by the editing device.

FIG. 13 is a flowchart showing an example of a flow of a process executed by the editing device 600A. The description of the processing similar to that of FIG. 11 will be omitted.

First, the information manager 610 acquires first images 652, second images 654, and speech information at predetermined intervals and causes the storage 650 to store the acquired images and the speech information (step S101). After the processing of step S102 and step S104, the information manager 610 derives a third score (step S105) and derives an integrated score on the basis of first, second, and third scores that have been derived (step S106). The processing of steps S108 to S114 is performed. Thereby, the process of one routine of the present flowchart is completed.

In the second embodiment described above, the editing device 600A extracts the first image 652 and the second image 654 from the first images 652 and the second images 654 of the time series on the basis of third index information, first index information, and a time point associated with the first image 652 based on the first index information and generates a library including the extracted images, so that the library more satisfactory to the user can be generated.

Third Embodiment

Hereinafter, a third embodiment will be described. In the third embodiment, editing is performed on the basis of a third score without using the first score and the second score. Hereinafter, the third embodiment will be described on the basis of differences from the first embodiment and the second embodiment.

Figure 14:
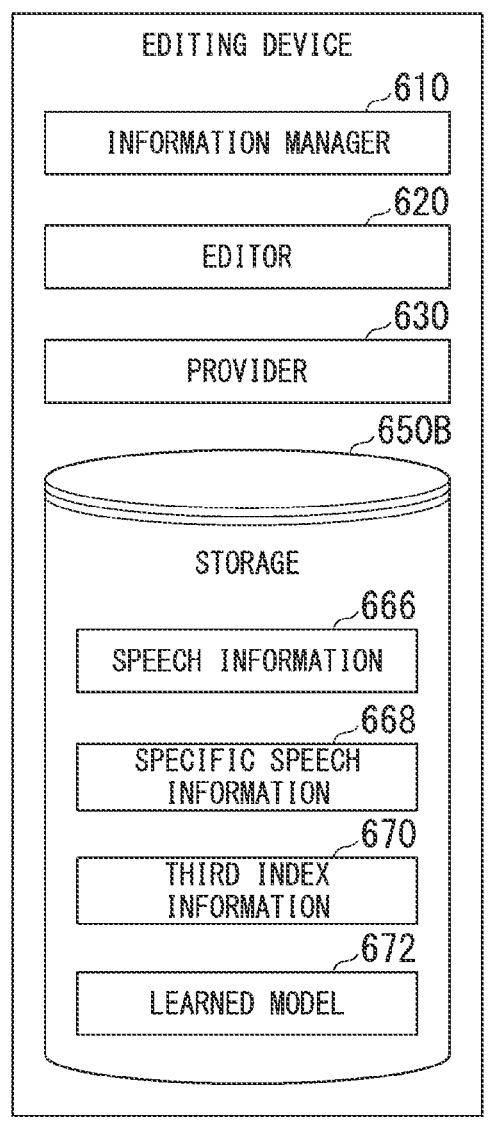
FIG. 14 is a diagram showing an example of a functional configuration of an editing device according to a third embodiment.

FIG. 14 is a diagram showing an example of a functional configuration of an editing device 600B according to the third embodiment. The editing device 600B includes, for example, an information manager 610, an editor 620, a provider 630, and a storage 650B. The provider 630 has a function similar to that of the provider 630 of the first embodiment.

The storage 650B stores speech information 666, specific speech information 668, and a learned model 672. The information manager 610 of the third embodiment derives the third score as in the process of the second embodiment described above. The editor 620 extracts a first image 652 and a second image 654 that are captured when speech whose third score is greater than or equal to a threshold value has been acquired, and includes the extracted images in an edited image.

Flowchart

Figure 15:
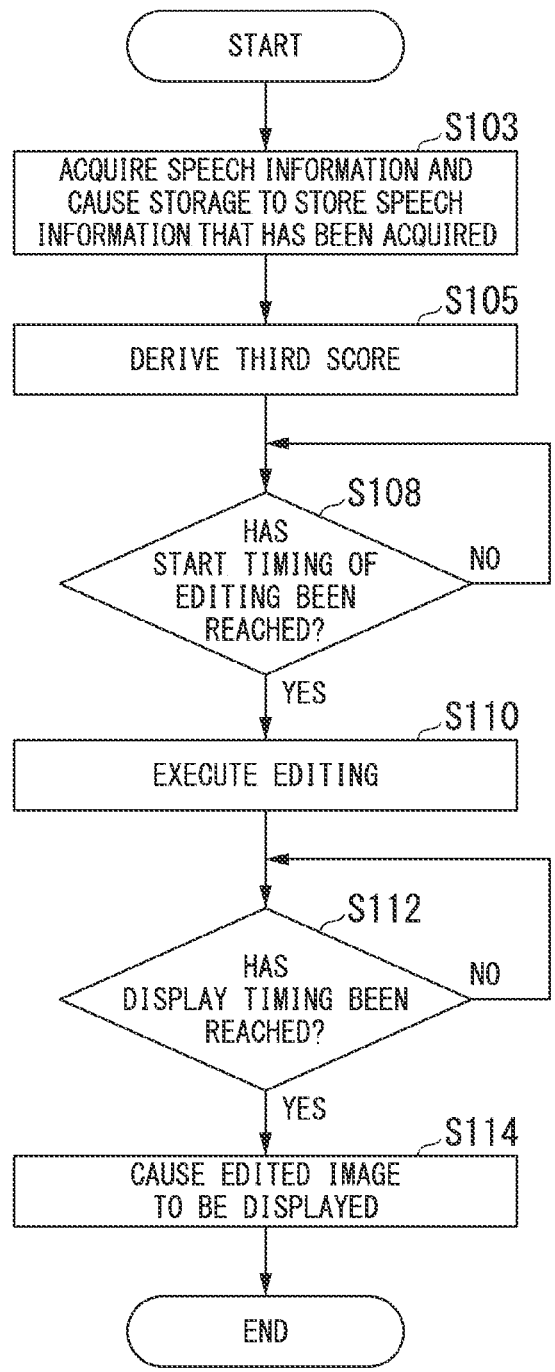
FIG. 15 is a flowchart showing an example of a flow of a process executed by the editing device.

FIG. 15 is a flowchart showing an example of a flow of a process executed by the editing device 600B. The description of processing similar to that of FIG. 11 will be omitted.

First, the information manager 610 acquires speech information at predetermined intervals and causes the storage 650B to store the acquired speech information (step S103). Subsequently, the information manager 610 derives a third score on the basis of the speech information stored in the storage 650B (step S105). The processing of steps S108 to S114 is executed. Thereby, the process of one routine of the present flowchart is completed.

According to the above-described third embodiment, the editing device 600B extracts a first image 652 and a second image 654 from first images 652 and second images 654 of a time series on the basis of a third score (index information) and a time point associated with speech information based on the third score and generates a library including the extracted images, so that effects similar to those of the first embodiment can be obtained.

[Others (Part 1)]

Figure 16:
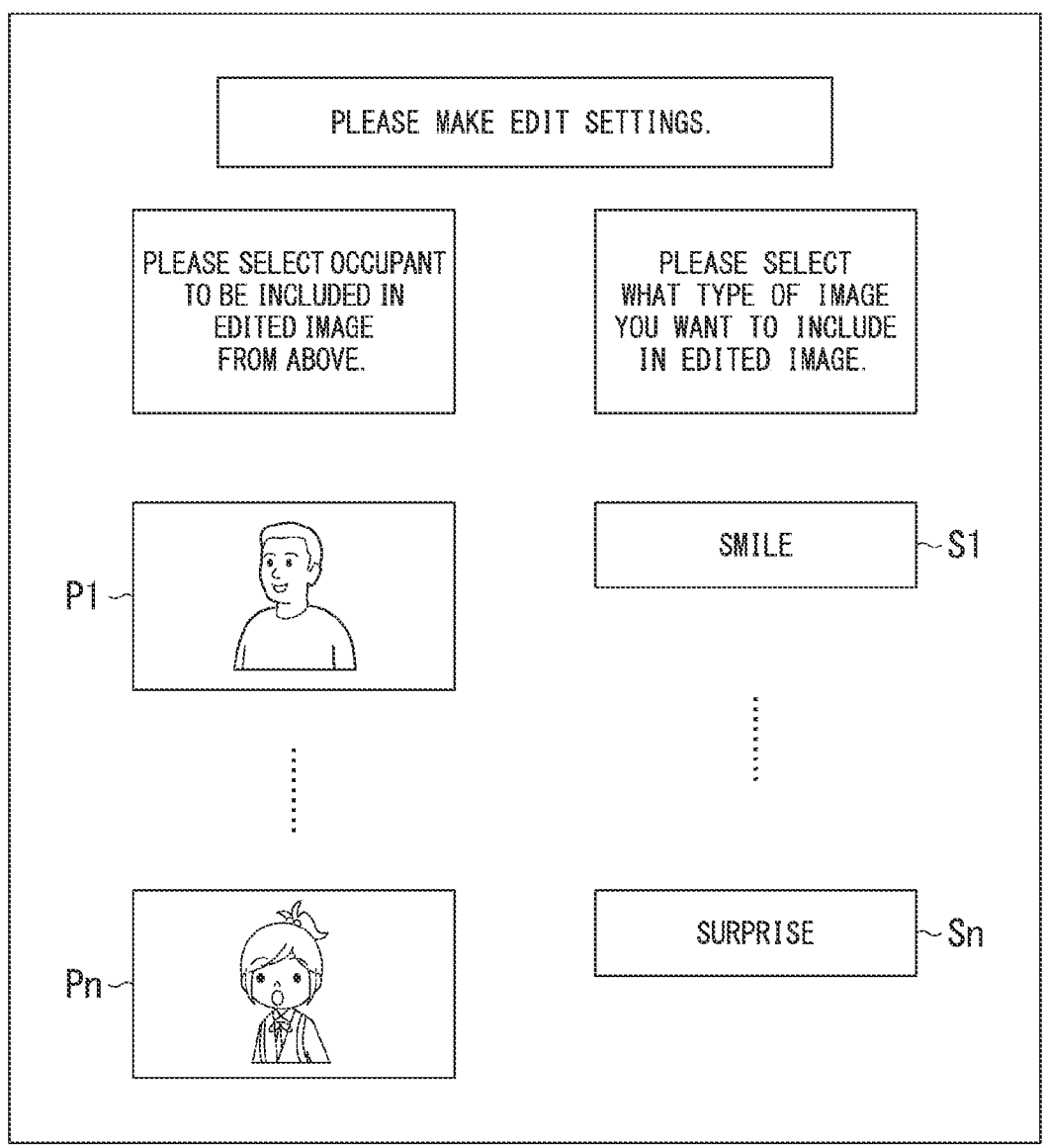
FIG. 16 is a diagram showing an example of an image for an occupant to determine an editing policy.

The editor 620 may generate an edited image on the basis of an instruction or settings of the occupant. FIG. 16 is a diagram showing an example of an image IM for the occupant to determine an editing policy. The image IM includes, for example, icons P1 to Pn for selecting the occupant to be included in the edited image and icons S1 or Sn for selecting a state of the occupant (a face when smiling or surprised) desired to be included in the edited image. The icons P1 to Pn are, for example, images of a plurality of occupants of the vehicle M. For example, when the occupant selects the icon P1 and the icon S1 (smile), the editor 620 includes the first image 652 when the occupant of the icon P1 is smiling and the second image 654 corresponding to the first image 652 in the edited image or includes more first images 652 when the occupant of the icon P1 is smiling and more second images 654 corresponding to the first images 652 than images in other states therein.

A degree at which the selected predetermined occupant or the state of the selected occupant is included in the edited image may be set on the basis of an operation of the occupant. For example, if a smiling occupant and occupants of the icon P1 is designates, the editor 620 includes more images of the occupants of the icon P1 of the smile than the images of other occupants and states other than the smile in the edited image.

When it is designated that an image of a child or a female occupant among the occupants is preferentially included in the edited image, the editor 620 may preferentially include a designated image in the edited image.

As described above, the editing device 600B can generate a library more satisfactory to the user by generating an edited image in consideration of the user's preference.

[Others (Part 2)]

The above-described edited image may be transmitted to a terminal device such as a smartphone or another vehicle via a network NW or vehicle-to-vehicle communication. Thereby, the editing device 600B can provide the edited image to acquaintances, family members, and the like who are not acting together.

[Others (Part 3)]

When the vehicle M visits or passes through a spot recommended by a third party, the editing device 600B may transmit an edited image including an image captured at the timing of visiting the spot or at the timing of passing through the spot to a vehicle or a terminal device managed by the third party. For example, when the agent device 400 acquires information about a recommended spot from the vehicle or the terminal device managed by the third party and instructs the vehicle M to pass through the acquired recommended spot, the vehicle M passes through the recommended spot. A first image 652 or a second image 654 captured at this time is provided to the vehicle or the terminal device managed by the third party. In this case, if the integrated score is greater than or equal to the threshold value when the vehicle passes through the recommended spot, the first image 652 or the second image 654 that has been captured may be provided to the vehicle or the terminal device managed by the third party.

[Others (Part 4)]

In addition to the first image 652 and the second image 654, the editor 620 may use an image captured by a camera different from the vehicle exterior camera 320 and the vehicle interior camera 330 as a target to be edited. In this case, the editing device 600B includes an image (a transmission image) associated with a time point, which is transmitted to the editing device 600B via a communication device 20 or a wire such as a USB cable, in an information set. The transmission image corresponds to the first image 652.

[Others (Part 5)]

The vehicle M may control a traveling position so that the vehicle exterior camera 320 images another vehicle designated in advance. For example, the vehicle M recognizes another vehicle on the basis of an image or a license plate of the other vehicle designated in advance and causes the vehicle exterior camera 320 to image the other vehicle that has been recognized. The editing device 600B may include the image of the other vehicle in the edited image or may transmit the edited image to the other vehicle.

[Others (Part 6)]

The edited image may include an image associated with a shop where the occupant has stopped by or a product selected at the shop. For example, the agent device 400 recommends shops where the occupant will stop by and products thereof. Recommendations are audio or image recommendations. The occupant can make a reservation for a shop or order a product via the agent device 400. For example, when the occupant inputs speech to the microphone 300 or operates the HMI 30, the agent device 400 makes a reservation or an order via the network NW on the basis of the above inputs or operations. The editing device 600B includes an image associated with a shop of a reservation made in accordance with a process performed by the agent device 400 and an image associated with the ordered product in the edited image. An image (a sample image) associated with the shop or an image (a sample image) associated with the ordered product may be acquired via the network NW or pre-stored in the storage 650.

The editing device 600B may not be mounted in the vehicle M. In this case, the vehicle M and the editing device 600B communicate with the vehicle M via the network NW to acquire an image or the like from the vehicle M.

Although modes for carrying out the present invention have been described using embodiments, the present invention is not limited to the embodiments and various modifications and substitutions can also be made without departing from the scope and spirit of the present invention.

What is claimed is:

1. An editing device comprising:
a memory configured to store instructions; and
one or more processors configured to execute the instructions to:
acquire a first image in which an occupant of a vehicle has been imaged in association with a first time point in a first time series and a second image in which scenery around the vehicle has been imaged in association with a second time point in a second time series,
acquire first index information indicating feelings of the occupant when the first image has been captured on the basis of the first image, and
extract the first image and the second image from first images of the first time series and second images of the second time series on the basis of the first index information and the first time point associated with the first image based on the first index information to generate a library including the extracted images
wherein the instructions further comprise instructions to:
cause a display of the vehicle to display an edited image that has been edited and include the extracted images, start editing at a first predetermined time point or at a first predetermined distance before the vehicle arrives at a destination,
end the editing at a second predetermined time point or at a second predetermined distance before the vehicle arrives at the destination, and
allow the edited image to be displayed until the vehicle arrives at the destination after the editing has ended.

2. The editing device according to claim 1,
wherein the instructions further comprise instructions to:
cause a storage to store the first images of the first time series and the second images of the second time series, and
extract the first image and the second image from the first images of the first time series and the second images of the second time series stored in the storage on the basis of the first index information and the first time point to generate the library including the extracted images.

3. The editing device according to claim 1,
wherein the instructions further comprise instructions to:
extract the first image based on the first index information associated with positive feelings and the second image captured at the second time point associated with the first image to generate the library including the extracted images.

4. The editing device according to claim 1,
wherein the instructions further comprise instructions to:
extract the first image and the second image on the basis of second index information associated with a position where the vehicle has traveled, the first index information, and the first time point to generate the library including the extracted images.

5. The editing device according to claim 1,
wherein the instructions further comprise instructions to:
acquire the first index information indicating the feelings of the occupant when the first image has been captured on the basis of a facial expression of the occupant included in the first image.

6. The editing device according to claim 1,
wherein the instructions further comprise instructions to:
acquire speech information indicating speech uttered by the occupant of the vehicle in association with a third time point in a third time series,
acquire third index information indicating feelings of the occupant when the first image has been captured on the basis of the speech information, and
extract the first image and the second image from the first images and the second images of the third time series on the basis of the third index information, the first index information, and the first time point associated with the first image based on the first index information to generate the library including the extracted images.

7. An editing device comprising:
a memory configured to store instructions; and
one or more processors configured to execute the instructions to:
acquire a first image in which an occupant of a vehicle has been imaged in association with a first time point in a first time series, a second image in which scenery around the vehicle has been imaged in association with a second time point in a second time series, and speech information indicating speech uttered by the occupant of the vehicle in association with a third time point in a third time series,
acquire index information indicating feelings of the occupant when the speech of the speech information has been uttered on the basis of the speech information,
extract the first image and the second image from first images of the first time series and second images of the second time series on the basis of the index information and the third time point associated with the speech information based on the index information to generate a library including the extracted images, cause a display of the vehicle to display an edited image that has been edited and include the extracted images,
start editing at a first predetermined time point or at a first predetermined distance before the vehicle arrives at a destination,
end the editing at a second predetermined time point or at a second predetermined distance before the vehicle arrives at the destination, and
allow the edited image to be displayed until the vehicle arrives at the destination after the editing has ended.

8. An editing method comprising:
acquiring, by a computer, a first image in which an occupant of a vehicle has been imaged in association with a first time point in a first time series and a second image in which scenery around the vehicle has been imaged in association with a second time point in a second time series,
acquiring, by the computer, first index information indicating feelings of the occupant when the first image has been captured on the basis of the first image,
extracting, by the computer, the first image and the second image from first images of the first time series and second images of the second time series on the basis of the first index information and the first time point associated with the first image based on the first index information to generate a library including the extracted images, causing, by the computer, a display of the vehicle to display an edited image that has been edited and include the extracted images,
starting, by the computer, editing at a first predetermined time point or at a first predetermined distance before the vehicle arrives at a destination,
ending, by the computer, the editing at a second predetermined time point or at a second predetermined distance before the vehicle arrives at the destination, and
allowing, by the computer, the edited image to be displayed until the vehicle arrives at the destination after the editing has ended.

9. The editing device according to claim 1,
wherein the instructions further comprise instructions to:
determine a starting time point of editing the first image and the second image based on the number of acquired first image and second image,
start editing the first image and the second image for generating the library based on the starting time point, the starting time point being a duration of time during which the editing is able to end before the vehicle arrives at the destination,
provide a user with the library so that the user is able to see edited images of the library after the vehicle has arrived at the destination.

* * * * *